US006105360A

United States Patent [19]

Willis

[11] Patent Number: 6,105,360

[45] Date of Patent: Aug. 22, 2000

[54] GAS TURBINE ENGINE COMBUSTION CHAMBER HAVING PREMIXED HOMOGENEOUS COMBUSTION FOLLOWED BY CATALYTIC COMBUSTION AND A METHOD OF OPERATION THEREOF

[75] Inventor: Jeffrey D Willis, Coventry, United Kingdom

[73] Assignee: Rolls-Royce plc, London, United Kingdom

[21] Appl. No.: 08/853,674

[22] Filed: May 9, 1997

[30] Foreign Application Priority Data

May 30, 1996 [GB] United Kingdom .................. 9611235

[51] Int. Cl.[7] .............................. F23R 3/14; F02C 7/228

[52] U.S. Cl. ............................................ 60/39.06; 60/723

[58] Field of Search .................................... 60/39.06, 723, 60/737, 748

[56] References Cited

U.S. PATENT DOCUMENTS

| | | | |
|---|---|---|---|
| 3,975,900 | 8/1976 | Pfefferle | 60/723 |
| 4,202,169 | 5/1980 | Acheson et al. | 60/723 |
| 4,432,207 | 2/1984 | Davis, Jr. et al. | 60/723 |
| 4,731,989 | 3/1988 | Furuya et al. | 60/39.06 |
| 5,307,636 | 5/1994 | Maus et al. | 60/274 |
| 5,452,574 | 9/1995 | Cowell et al. | 60/723 |
| 5,461,855 | 10/1995 | Inoue et al. | 60/39.06 |
| 5,623,819 | 4/1997 | Bowker et al. | 60/723 |

FOREIGN PATENT DOCUMENTS

| | | | |
|---|---|---|---|
| 686 813 | 12/1995 | European Pat. Off. . | |
| 0050416 | 3/1991 | Japan | 60/723 |
| 1 489 339 | 10/1977 | United Kingdom . | |
| 1 575 427 | 9/1980 | United Kingdom . | |
| 2 202 462 | 9/1988 | United Kingdom . | |
| 2 268 694 | 1/1994 | United Kingdom . | |
| 92/07221 | 4/1992 | WIPO . | |

*Primary Examiner*—Timothy S. Thorpe
*Assistant Examiner*—Ted Kim
*Attorney, Agent, or Firm*—W. Warren Taltavull; Farkas & Manelli PLLC

[57] ABSTRACT

A gas turbine engine combustion chamber comprises a primary combustion zone and a secondary combustion zone downstream of the primary combustion zone. A catalytic combustion zone is arranged downstream of the secondary combustion zone and a homogeneous combustion zone is arranged downstream of the catalytic combustion zone. A pilot injector supplies fuel into the primary combustion zone. At least one primary premixing duct has a plurality of primary fuel injectors to supply a first mixture of fuel and air into the primary combustion zone. A secondary premixing duct has a plurality of secondary fuel injectors to supply a second mixture of fuel and air into the secondary combustion zone. A plurality of temperature sensors are arranged at the intake to the catalytic combustion zone and a processor controls the valves which adjust the supply of fuel the fuel injectors to ensure that the temperature at the intake to the catalytic combustion zone remains in a predetermined temperature range.

20 Claims, 2 Drawing Sheets

GAS TURBINE ENGINE COMBUSTION CHAMBER HAVING PREMIXED HOMOGENEOUS COMBUSTION FOLLOWED BY CATALYTIC COMBUSTION AND A METHOD OF OPERATION THEREOF

THE FIELD OF THE INVENTION

The present invention relates to a combustion chamber for a gas turbine engine, and to a method of operating a gas turbine engine combustion chamber.

BACKGROUND OF THE INVENTION

In order to meet the emission level requirements, for industrial low emission gas turbine engines, staged combustion is required in order to minimise the quantity of the oxides of nitrogen (NOx) produced. Currently the emission level requirement is for less than 25 volumetric parts per million of NOx for an industrial gas turbine exhaust. The fundamental way to reduce emissions of nitrogen oxides is to reduce the combustion reaction temperature and this requires premixing of the fuel and all the combustion air before combustion takes place.

It is known to provide gas turbine engine combustion chambers which have staged combustion to minimise nitrous oxide (NOx) emissions. Our UK patent no 1489339 discloses two stages of fuel injection in a gas turbine engine combustion chamber to reduce NOx. Our International patent application No. 9207221, published Apr. 30, 1992 discloses two and three stages of fuel injection in a gas turbine engine combustion chamber. In staged combustion, all the stages of combustion seek to provide lean combustion and hence the low combustion temperatures required to minimise NOx. The term lean combustion means combustion of fuel in air where the fuel to air ratio is low, i.e. weaker than the stoichiometric ratio. A problem with this arrangement is that it does not minimise the emission of nitrous oxide (NOx) to below the current emission level requirement of 25 volumetric parts per million of NOx for an industrial gas turbine exhaust throughout the range 40% to 100% power of the gas turbine engine, with simultaneous low emission levels of carbon monoxide. Furthermore this arrangement requires accurate knowledge of the fuel composition, and the air humidity to control the relative proportions of fuel and air supplied to the combustion chamber in order to minimise the emissions of NOx. Additionally the fuel valves require precise calibration in order to achieve this.

It is also known to provide gas turbine engine combustion chambers which have a plurality of catalytic combustion zones arranged in series to minimise nitrous oxide (NOx) emissions. One known arrangement is described in our United Kingdom patent application 2268694A, published Jan. 19, 1994.

A problem with this arrangement is that it does not fit into the space available, and it may require staged fuelling between the catalytic combustion zones.

SUMMARY OF THE INVENTION

The present invention seeks to provide a novel gas turbine engine combustion chamber and a novel method of operating a gas turbine engine combustion chamber which overcomes the above mentioned problems.

Accordingly the present invention provides a gas turbine engine combustion chamber comprising a primary combustion zone, a secondary combustion zone downstream of the primary combustion zone, a pilot injector to supply fuel into the primary combustion zone, at least one primary premixing duct to supply a first mixture of fuel and air into the primary combustion zone, at least one secondary premixing duct to supply a second mixture of fuel and air into the secondary combustion zone, the primary premixing duct has air inlet means to supply air into the primary premixing duct and primary fuel injector means to supply fuel into the primary premixing duct, the secondary premixing duct has air inlet means to supply air into the secondary premixing duct and secondary fuel injector means to supply fuel into the secondary premixing duct, a catalytic combustion zone downstream of the secondary combustion zone and a homogeneous combustion zone downstream of the catalytic combustion zone.

Preferably valve means are provided to control the flow of fuel to the pilot injector, the primary injector means and the secondary injector means, at least one temperature sensor is arranged at the upstream end of the catalytic combustion zone to measure the temperature at the upstream end of the catalytic combustion zone and a processor is electrically connected to the temperature sensor so as to receive a measure of the temperature detected by the temperature sensor and the processor is arranged to control the valve means such that the temperature at the upstream end of the catalytic combustion zone remains in a predetermined temperature range.

Preferably stabiliser means are provided downstream of the catalytic combustion zone.

Preferably the stabiliser means comprises an increase in cross-sectional area of the transition duct.

According to a further aspect of the present invention a method of operating a gas turbine engine combustion chamber comprising a primary combustion zone, a secondary combustion zone downstream of the primary combustion zone, a pilot injector to supply fuel into the primary combustion zone, at least one primary premixing duct to supply a first mixture of fuel and air into the primary combustion zone, at least one secondary premixing duct to supply a second mixture of fuel and air into the secondary combustion zone, the primary premixing duct has air inlet means to supply air into the primary premixing duct and primary fuel injector means to supply fuel into the primary premixing duct, the secondary premixing duct has air inlet means to supply air into the secondary premixing duct and secondary fuel injector means to supply fuel into the secondary premixing duct, a catalytic combustion zone downstream of the secondary combustion zone and a homogeneous combustion zone downstream of the catalytic combustion zone, the method comprising (a) supplying fuel to the first combustion zone from the pilot injector in a first mode of operation, (b) supplying fuel to the first combustion zone from the pilot injector and supplying fuel to the second combustion zone from the secondary fuel injector means through the secondary premixing duct in a second mode of operation, and (c) supplying fuel to the primary combustion zone from the primary fuel injection means through the primary premixing duct and supplying fuel to the secondary combustion zone from the secondary fuel injector means through the secondary premixing duct in a third mode of operation.

Preferably the method comprises measuring the temperature at the upstream end of the catalytic combustion zone, determining if the temperature at the upstream end of the catalytic combustion is within a predetermined temperature range and controlling the flow of fuel to the pilot injector, the primary fuel injector means and the secondary injector means such that the temperature at the upstream end of the catalytic combustion zone remains in the predetermined temperature range.

BRIEF DESCRIPTION OF THE DRAWINGS

The present invention will be more fully described by way of example with reference to the accompanying drawings, in which.

DETAILED DESCRIPTION OF THE INVENTION

Figure 1:
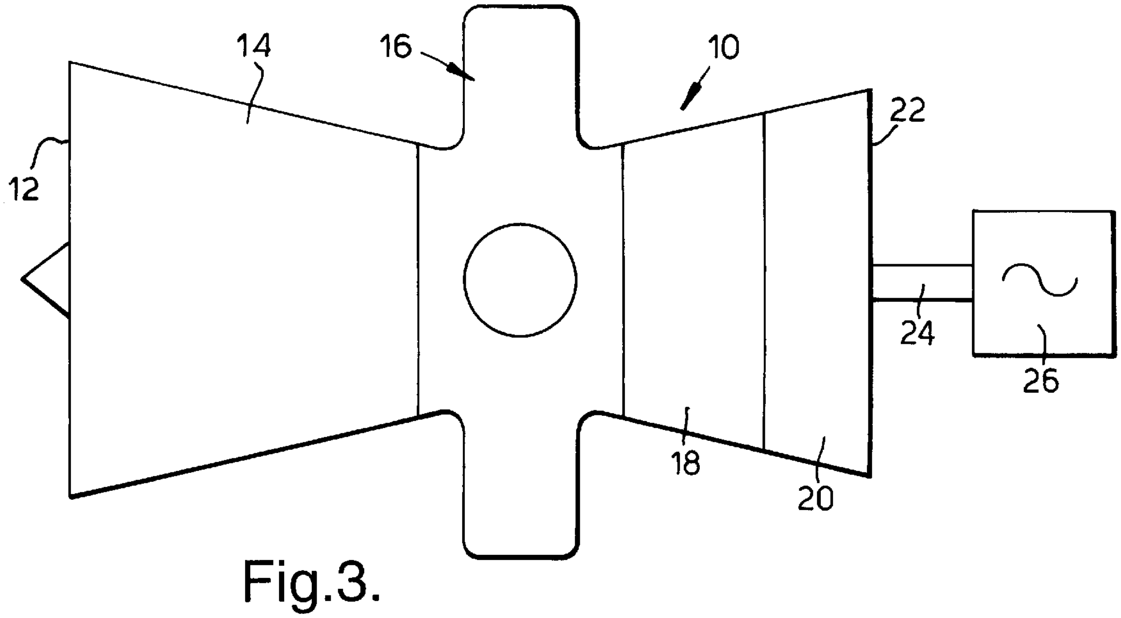
FIG. 1 is a view of a gas turbine engine having a combustion chamber according to the present invention.

An industrial gas turbine engine 10, shown in FIG. 1, comprises in flow series an inlet 12, a compressor section 14, a combustion chamber assembly 16, a turbine section 18, a power turbine section 20 and an exhaust 22. The turbine section 18 is arranged to drive the compressor section 14 via one or more shafts (not shown). The power turbine section 20 is arranged to drive an electrical generator 26, via a shaft 24. However, the power turbine section 20 may be arranged to provide drive for other purposes, for example a gas compressor or a pump etc. The operation of the gas turbine engine 10 is quite conventional, and will not be discussed further.

Figure 3:
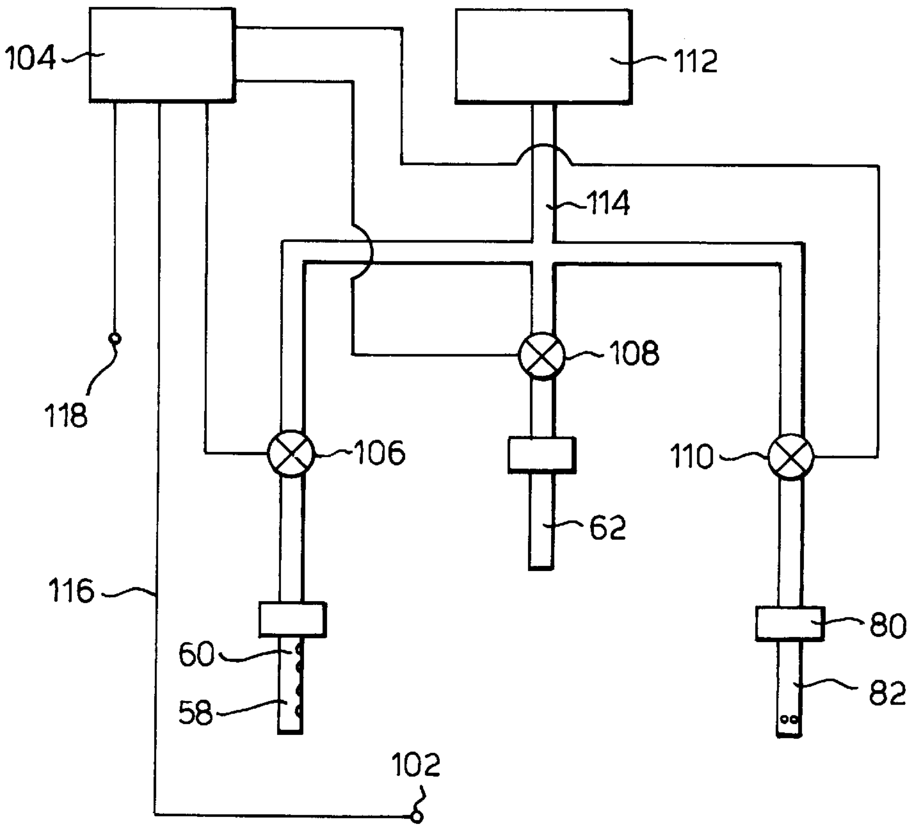
FIG. 3 is a schematic diagram of the fuel injectors and fuel control for the gas turbine engine combustion chamber shown in FIG. 2.
Figure 2:
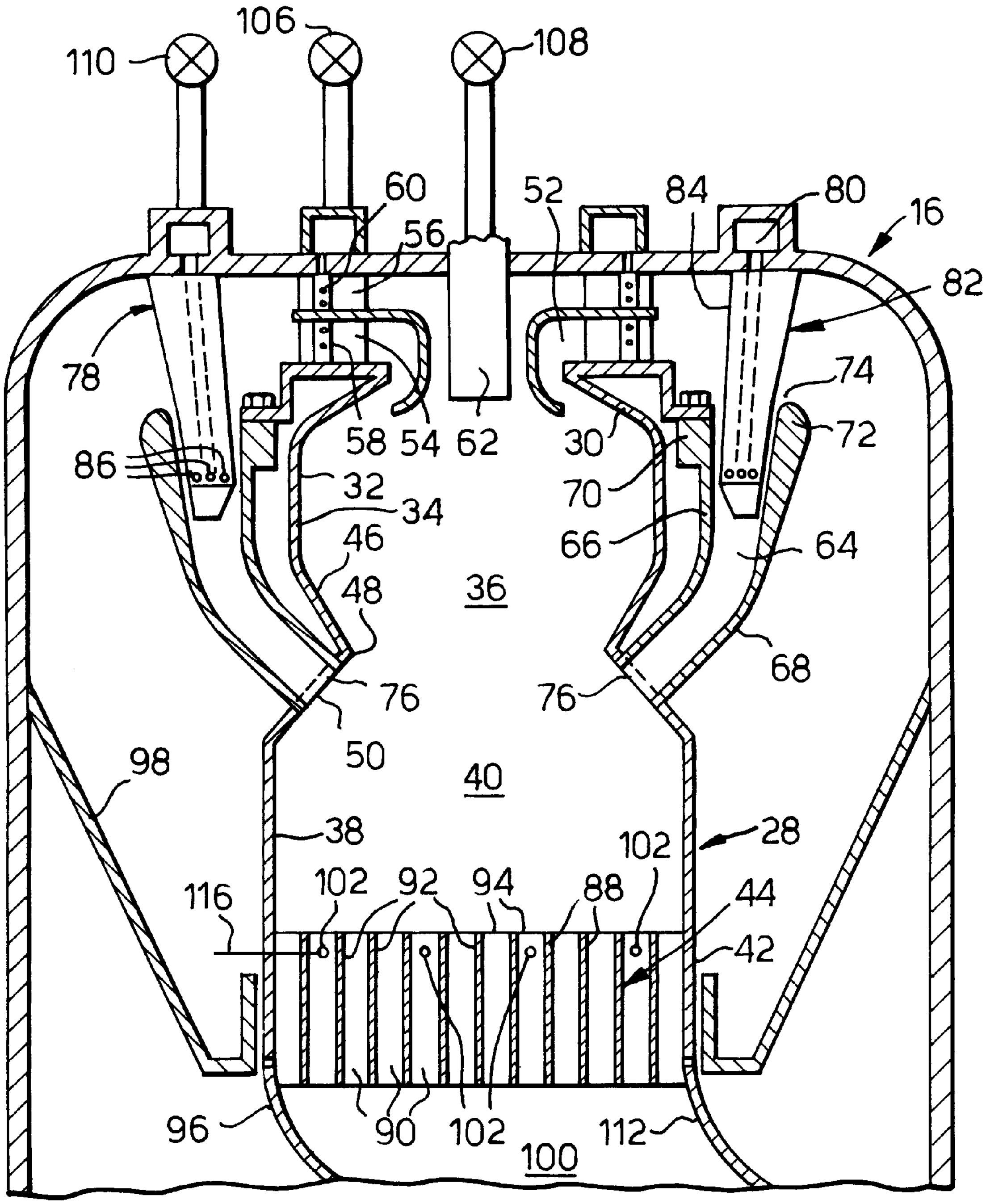
FIG. 2 is an enlarged longitudinal cross-sectional view through the combustion chamber shown in FIG. 1.

The combustion chamber assembly 16 is shown more clearly in FIGS. 2 and 3. The combustion chamber assembly 16 comprises a plurality of, for example nine, equally circumferentially spaced tubular combustion chambers 28. The axes of the tubular combustion chambers 28 are arranged to extend in generally radial directions. The inlets of the tubular combustion chambers 28 are at their radially outermost ends and their outlets are at their radially innermost ends.

Each of the tubular combustion chambers 28 comprises an upstream wall 30 secured to the upstream end of an annular wall 32. A first, upstream, portion 34 of the annular wall 32 defines a primary combustion zone 36, a second, intermediate, portion 38 of the annular wall 32 defines a secondary combustion zone 40 and a third, downstream, portion 42 of the annular wall 32 encloses a catalytic combustion zone 44. The downstream end of the first portion 34 has a frustoconical portion 46 which reduces in diameter to a throat 48. The second portion 38 of the annular wall 32 has a greater diameter than the first portion 34. A frustoconical portion 50 interconnects the throat 48 with the upstream end of the second portion 38.

The upstream wall 30 of each of the tubular combustion chambers 28 has an aperture 52 to allow the supply of air and fuel into the primary combustion zone 36. A first radial flow swirler 54 is arranged coaxially with the aperture 52 in the upstream wall 30 and a second radial flow swirler 56 is arranged coaxially with the aperture 52 in the upstream wall 30. The first radial flow swirler 54 is positioned axially downstream, with respect to the axis of the tubular combustion chamber 28, of the second radial flow swirler 56. The first radial flow swirler 54 has a plurality of primary fuel injectors 58, each of which is positioned in a passage formed between two vanes of the swirler. The second radial flow swirler 56 has a plurality of primary fuel injectors 60, each of which is positioned in a passage formed between two vanes of the swirler. The first and second radial flow swirlers 54 and 56 are arranged such that they swirl the air in opposite directions. In this particular example the primary fuel injectors 58 and the primary fuel injectors 60 are in fact two axially spaced sets of apertures in each one of a plurality of axially extending hollow tubular members. For a more detailed description of the use of the two radial flow swirlers and the fuel injectors positioned in the passages formed between the vanes see our International patent application no WO9207221. The primary fuel and air is mixed together in the passages between the vanes of the first and second radial flow swirlers 54 and 56. The premixed fuel and air mixture leaving the first and second radial flow swirlers 54 and 56 is supplied into the primary combustion zone 36. The first and second radial flow swirlers 54, 56 define primary fuel and air mixing ducts.

Also a central pilot injector 62 is provided at the upstream end of each tubular combustion chamber 28. Each central pilot injector 62 is arranged coaxially with, and on the axis of, the respective aperture 52. Each central pilot injector 62 is arranged to supply fuel into the primary combustion zone 36.

An annular secondary fuel and air mixing duct 64 is provided for each of the tubular combustion chambers 28. Each secondary fuel and air mixing ducts 64 is arranged coaxially around the primary combustion zone 36. Each of the secondary fuel and air mixing ducts 64 is defined between a second annular wall 66 and a third annular wall 68. The second annular wall 66 defines the radially inner extremity of the secondary fuel and air mixing duct 64 and the third annular wall 68 defines the radially outer extremity of the secondary fuel and air mixing duct 64. The axially upstream end 70 of the second annular wall 66 is secured to a side plate of the first radial flow swirler 54. The axially upstream ends 70 and 72 of the second and third annular walls 66 and 68 are substantially in the same plane perpendicular to the axis of the tubular combustion chamber 28. The secondary fuel and air mixing duct 64 has a secondary air intake 74 defined radially between the upstream end 70 of the second annular wall 64 and the upstream end 72 of the third annular wall 66.

At the downstream end of the secondary fuel and air mixing ducts 64, the second and third annular walls 66 and 68 respectively are secured to the frustoconical portion 50 and the frustoconical portion 50 is provided with a plurality of equi-circumferentially spaced apertures 76. The apertures 76 are arranged to direct the fuel and air mixture into the secondary combustion zone 40 in the tubular combustion chamber 28, in a downstream direction towards the axis of the tubular combustion chamber 28. The apertures 76 may be circular or slots and are of equal flow area.

The secondary fuel and air mixing ducts 64 reduce gradually in cross-sectional area from the intake 74 at its upstream end to the apertures 76 at its downstream end. The second and third annular walls 66 and 68 of the secondary fuel and air mixing duct 64 are shaped to produce an aerodynamically smooth duct 64. The shape of the secondary fuel and air mixing duct 64 therefore produces an accelerating flow through the duct 64 without any regions where recirculating flows may occur.

A plurality of secondary fuel systems 78 are provided, to supply fuel to the secondary fuel and air mixing duct 64 of each of the tubular combustion chambers 28. The secondary fuel system 78 for each tubular combustion chamber 28 comprises an annular secondary fuel manifold 80 arranged coaxially with the tubular combustion chamber 28 at the upstream end of the tubular combustion chamber 28. Each secondary fuel manifold 80 has a plurality, for example thirty two, of equi- circumferentially spaced secondary fuel injectors 82. Each of the secondary fuel injectors 82 comprises a hollow member 84 which extends axially with respect to the tubular combustion chamber 28, from the secondary fuel manifold 80 in a downstream direction through the intake 74 of the secondary fuel and air mixing duct 64 and into the secondary fuel and air mixing duct 64. The secondary fuel injectors 82 have apertures 86 which direct fuel substantially in circumferential directions from opposite sides of the hollow member 84. Our European patent application no 0687864A2 published Dec. 20, 1995, gives a more complete description of the secondary fuel injectors. However it may be possible to use secondary fuel injectors as described in our International patent application no WO9207221.

The catalytic combustion zone 44 in each tubular combustion chamber 28 comprises a honeycomb structure 88 which is catalyst coated or comprises a catalyst, for example the catalytic combustion zone may comprise a catalyst coated ceramic honeycomb monolith or a catalyst coated metallic honeycomb, or a ceramic honeycomb monolith containing catalyst. The honeycomb structure 88 of the catalytic combustion zone 44 comprises a plurality of passages 90 separated by catalyst coated walls 92. The passages 90 have entrances 94 at their upstream ends. The catalytic combustion zone 44 need not be limited to honeycomb structures.

A plurality of transition ducts 96 are provided in the combustion chamber assembly 16, and the upstream end of each transition duct 96 has a circular cross-section. The upstream end of each transition duct 96 is located coaxially with the downstream end of a corresponding one of the tubular combustion chambers 28, and each of the transition ducts 96 connects and seals with an angular section of the nozzle guide vanes. The downstream end of each tubular combustion chamber 28 and the upstream end of the corresponding transition duct 96 are located in a support structure 98, for example as described in our UK patent application no 2293232A published Mar. 20, 1996.

A homogeneous combustion zone 100 is defined downstream of the catalytic combustion zone 44 within the transition duct 96.

The catalytic combustion zone 44 is provided with one or more temperature sensors 102, for example thermocouples, located at its upstream end in the entrances 94 of the passages 90 of the honeycomb structure 88. The temperature sensors 102 measure the temperature at the entry to the catalytic combustion zone 44 and provide one or more electrical signals corresponding to the measured temperature at the entry to the catalytic combustion zone 44 which are supplied to a processor 104 via electrically conducting wires 116. The processor 104 analyses the electrical signals provided by the temperature sensors 102 and controls the operation of fuel valves 106, 108 and 110 which control the supply of fuel from a fuel supply 112 via a pipe 114 to the primary fuel injectors 58 and 60, the pilot fuel injectors 62, and the secondary fuel injectors 82 respectively, in order to maintain the temperature at the entry to the catalytic combustion zone 44 within a predetermined temperature range.

The transition duct 96 is provided with a stabiliser 113 to stabilise the homogeneous combustion process, the stabiliser preferably is in the form of a sudden increase in cross-sectional area of the transition duct 96.

In operation the processor 104 maintains the temperature at entry to the catalytic combustion zone 44 typically in the temperature range 650° C. to 850° C. The temperature range selected is dependent on the particular catalyst material used in the catalytic combustion zone 44. At very low powers, below about 10% of full power, the processor 104 closes the valves 106 and 110 and opens the valve 108 such that all the fuel is supplied into the primary combustion zone 36 from the pilot fuel injectors 62. At powers above about 10% of full power and less than about 40% of full power the processor 104 closes the valve 106 and opens valves 108 and 110 such that fuel is supplied into the primary combustion zone 36 from the pilot fuel injectors 62 and into the secondary combustion zone 40 from the secondary fuel injectors 82. At powers above about 40% of full power and up to full power the processor 104 closes the valve 108 and opens the valves 106 and 110 such that fuel is supplied into the primary combustion zone 36 from the primary fuel injectors 58,60 and is supplied into the secondary combustion zone 40 from the secondary fuel injectors 82. The specific power levels quoted are for the arrangement described and will vary depending on the compressor performance.

At high powers the processor 104 maintains the temperature at the intake to the catalytic combustion zone 44 at the minimum temperature within the predetermined temperature range, e.g. 650° C., and the length of the catalytic combustion zone 44 is selected such that the maximum wall temperature within the catalytic combustion zone 44 does not exceed for example 1100° C., this temperature is again dependent upon the catalyst material in the catalytic combustion zone 44. It is also necessary to ensure that the minimum temperature is achieved at the intake to the catalytic combustion zone 44 such that the temperature in the primary combustion zone 36 is about 1800° K., 1527° C. This is achieved by selecting the primary and secondary air flow distribution such that at maximum power the temperature in the primary combustion zone 36 is at its minimum to achieve the lowest temperature at the intake to the catalytic combustion zone 44 after the primary and secondary flows have mixed. In the specific example this is achieved by reducing the amount of primary air supplied into the primary combustion zone 36. The combustion reactions are completed in the homogeneous combustion zone 100.

As the power gradually decreases from the high powers the processor 104 gradually increases the temperature at the intake to the catalytic combustion zone 44, to ensure a higher conversion rate in the catalytic combustion zone 44 and also to ensure that complete homogeneous reactions occur in the homogeneous combustion zone 100. As a consequence of selecting the primary and secondary air flows to the primary combustion zone 36 and secondary combustion zone 40 at high powers to achieve a primary temperature of about 1800° K., the temperature in the primary combustion zone 36 is about 1950° K. at lower powers, about 40% of full power. As the power gradually reduces the temperature of the air delivered from the compressor reduces and the fuel concentration reduces, thus for a constant catalytic combustion zone intake temperature the catalytic combustion zone outlet temperature reduces. To maintain a constant catalytic combustion zone outlet temperature the catalytic combustion zone intake temperature is increased by increasing the temperature in the primary combustion zone. The power levels for switching are dictated by the temperature of the air delivered by the compressor, and thus the fuel control requires at least one temperature sensor 18 to measure the temperature of the air delivered to the combustion chamber of the compressor. The at least one temperature sensor 188 is positioned at a suitable position, for example at the downstream end of the compressors. The temperature sensor 118 for example a thermocouple.

This arrangement will then reduce the NOx levels relative to the two stages, or three stages, of fuel injection in a gas turbine engine combustion chamber in which all the stages of combustion seek to provide lean combustion and hence the low combustion temperatures required to minimise NOx by approximately 50%, due solely to the reduction in the amount of primary air used in the primary combustion zone. This arrangement also enables the NOx levels to be less than 25 volumetric parts per million throughout the range 40% to 100% full power, while maintaining low emission levels of carbon monoxide. The reduction in primary air used is due to the reduced amount of fuel used in the primary combustion zone 36, which operates at a higher temperature than the secondary combustion zone 40.

A further advantage of the present invention is that the primary fuel demand is dictated by the temperature sensors in the intakes of the catalytic combustion zone, and therefore this removes the need for knowledge of the fuel composition and the air humidity. Also the fuel valves do not need require precise calibration.

Additionally the catalytic combustion zone may be fitted into the existing arrangement.

Although the invention has referred to swirlers for the mixing of the primary fuel and air any other suitable mixing devices may be used to mix the primary fuel and air. Similarly any suitable mixing devices for the secondary fuel and air may be used. The invention has been described with reference to tubular combustion chambers but it is also applicable to annular combustion chambers, and other types of combustion chamber.

The temperature has been described with reference to a thermocouple, however other suitable temperature sensors may be used.

I claim:

1. A gas turbine engine combustion chamber comprising a lean burning primary combustion zone, a lean burning secondary combustion zone downstream of the primary combustion zone, a pilot fuel injector to supply fuel into the primary combustion zone, at least one primary premixing duct to supply a first mixture of fuel and air into the primary combustion zone, at least one secondary premixing duct to supply a second mixture of fuel and air into the secondary combustion zone, wherein the primary premixing duct has air inlet means to supply air into the primary premixing duct and primary fuel injector means to supply fuel into the primary premixing duct, the secondary premixing duct has air inlet means to supply air into the secondary premixing duct and secondary fuel injector means to supply fuel into the secondary premixing duct, a catalytic combustion zone downstream of the secondary combustion zone and a homogeneous combustion zone downstream of the catalytic combustion zone.

2. A gas turbine engine combustion chamber as claimed in claim 1 wherein said catalytic combustion zone has an upstream end, valve means are provided to control flow of fuel to the pilot fuel injector, the primary fuel injector means and the secondary fuel injector means, at least one temperature sensor is arranged at the upstream end of the catalytic combustion zone to measure the temperature at the upstream end of the catalytic combustion zone and a processor is electrically connected to the temperature sensor so as to receive a measure of the temperature detected by the temperature sensor, and the processor is arranged to control the valve means such that the temperature at the upstream end of the catalytic combustion zone remains in a predetermined range.

3. A gas turbine engine combustion chamber as claimed in claim 2 wherein there are a plurality of temperature sensors.

4. A gas turbine engine combustion chamber as claimed in claim 2 wherein the at least one temperature sensor comprises a thermocouple.

5. A gas turbine engine combustion chamber as claimed in claim 2 wherein at least one temperature sensor is arranged to measure the temperature of the air supplied to the combustion chamber.

6. A gas turbine engine combustion chamber as claimed in claim 1 wherein stabiliser means are provided downstream of the catalytic combustion zone.

7. A gas turbine engine combustion chamber as claimed in claim 6 wherein the stabiliser means comprises an increase in cross-sectional area of a transition duct.

8. A gas turbine engine combustion chamber as claimed in claim 1 wherein the combustion chamber is tubular.

9. A gas turbine engine combustion chamber as claimed in claim 1 wherein there are a plurality of primary premixing ducts.

10. A gas turbine engine combustion chamber as claimed in claim 9 wherein the primary premixing ducts are defined by at least one swirler assembly.

11. A gas turbine engine combustion chamber as claimed in claim 10 wherein the at least one swirler assembly is a radial flow swirler assembly.

12. A gas turbine engine combustion chamber as claimed in claim 1 wherein there is a single secondary premixing duct.

13. A gas turbine engine combustion chamber as claimed in claim 12 wherein the secondary premixing duct is annular.

14. A method of operating a gas turbine engine combustion chamber comprising a primary combustion zone, a secondary combustion zone downstream of the primary combustion zone, a pilot fuel injector to supply fuel into the primary combustion zone, at least one primary premixing duct to supply a first mixture of fuel and air into the primary combustion zone, at least one secondary premixing duct to supply a second mixture of fuel and air into the secondary combustion zone, the primary premixing duct has air inlet means to supply air into the primary premixing duct and primary fuel injector means to supply fuel into the primary premixing duct, the secondary premixing duct has air inlet means to supply air into the secondary premixing duct and secondary fuel injector means to supply fuel into the secondary premixing duct, a catalytic combustion zone downstream of the secondary combustion zone and a homogeneous combustion zone downstream of the catalytic combustion zone, the method comprising (a) supplying fuel to the first combustion zone from the pilot fuel injector in a first mode of operation, (b) supplying fuel to the first combustion zone from the pilot fuel injector and supplying fuel to the second combustion zone from the secondary fuel injector means through the secondary premixing duct in a second mode of operation, and (c) supplying fuel to the primary combustion zone from the primary fuel injector means through the primary premixing duct and supplying fuel to the secondary combustion zone from the secondary fuel injector means through the secondary premixing duct in a third mode of operation.

15. A method of operating a gas turbine engine combustion chamber comprising a primary combustion zone, a secondary combustion zone downstream of the primary combustion zone, a pilot fuel injector to supply fuel into the primary combustion zone, at least one primary premixing duct to supply a first mixture of fuel and air into the primary combustion zone, at least one secondary premixing duct to supply a second mixture of fuel and air into the secondary combustion zone, the primary premixing duct having air inlet means to supply air into the primary premixing duct and primary fuel injector means to supply fuel into the primary premixing duct, the secondary premixing duct has air inlet means to supply air into the secondary premixing duct and secondary fuel injector means to supply fuel into the secondary premixing duct, a catalytic combustion zone downstream of the secondary combustion zone and a homogeneous combustion zone downstream of the catalytic combustion zone, said catalytic combustion zone having an upstream end, the method comprising (a) supplying fuel to the first combustion zone from the pilot fuel injector in a first mode of operation, (b) supplying fuel to the first combustion zone from the pilot fuel injector and supplying fuel to the second combustion zone from the secondary fuel injector means through the secondary premixing duct in a second mode of operation, and (c) supplying fuel to the primary combustion zone from the primary fuel injector means through the primary premixing duct and supplying fuel to the secondary combustion zone from the secondary fuel injector means through the secondary premixing duct in a third mode of operation and including the step of measuring the temperature at the upstream end of the catalytic combustion zone, determining if the temperature at the upstream end of the catalytic combustion is within a predetermined temperature range and controlling the flow of fuel to the pilot fuel injector, the primary fuel injector means and the secondary fuel injector means such that the temperature at the upstream end of the catalytic combustion zone remains in the predetermined temperature range.

16. A method of operating a gas turbine engine combustion chamber as claimed in claim 15 wherein the predetermined temperature range is 650° C. to 850° C.

17. A method of operating a gas turbine engine combustion chamber as claimed in claim 15 wherein the method comprises controlling the flow of fuel to the primary fuel injector means and the secondary fuel injector means in the third mode of operation such that the temperature at the upstream end of the catalytic combustion zone is substantially at a minimum temperature within the predetermined temperature range.

18. A gas turbine engine combustion chamber comprising a primary combustion zone, a secondary combustion zone downstream of the primary combustion zone, a pilot fuel injector to supply fuel into the primary combustion zone, at least one primary premixing duct to supply a first mixture of fuel and air into the primary combustion zone, at least one secondary premixing duct to supply a second mixture of fuel and air into the secondary combustion zone, the primary premixing duct having air inlet means to supply air into the primary premixing duct and primary fuel injector means to supply fuel into the primary premixing duct, the secondary premixing duct having air inlet means to supply air into the secondary premixing duct and secondary fuel injector means to supply fuel into the secondary premixing duct, a catalytic combustion zone downstream of the secondary combustion zone and a homogeneous combustion zone downstream of the catalytic combustion zone, valve means being provided to control the flow of fuel to the pilot fuel injector, the primary fuel injector means and the secondary fuel injector means, said catalytic combustion zone having an upstream end and passages therethrough, at least one temperature sensor being arranged at the upstream end of the catalytic combustion zone to measure the temperature at the upstream end of the catalytic combustion zone and a processor being electrically connected to the temperature sensor so as to receive a measure of the temperature detected by the temperature sensor, and the processor being arranged to control the valve means such that the temperature at the upstream end of the catalytic combustion zone remains in a predetermined temperature range, said at least one temperature sensor being located in the passages of the catalytic combustion zone.

19. A gas turbine engine combustion chamber comprising a lean burning primary combustion zone, a lean burning secondary combustion zone downstream of the primary combustion zone, a catalytic combustion zone downstream of the secondary combustion zone and a homogeneous combustion zone downstream of the catalytic combustion zone, the catalytic combustion zone having an upstream end, at least one primary premixing duct to supply a first mixture of fuel and air into the primary combustion zone, the primary premixing duct having air inlet means to supply air into the primary premixing duct and primary fuel injector means to supply fuel into the primary premixing duct, at least one secondary premixing duct to supply a second mixture of fuel and air into the secondary combustion zone, the secondary premixing duct having air inlet means to supply air into the secondary premixing duct and secondary fuel injector means to supply fuel into the secondary premixing duct, valve means to control the flow of fuel to the primary fuel injector means and the secondary fuel injector means, at least one temperature sensor arranged at the upstream end of the catalytic combustion zone to measure the temperature at the upstream end of the catalytic combustion zone, and a processor electrically connected to the at least one temperature sensor so as to receive a measure of the temperature detected by the at least one temperature sensor, the processor being arranged to control the valve means such that the temperature at the upstream end of the catalytic combustion zone remains in a predetermined range.

20. The combustion chamber as claimed in claim 19 wherein a pilot fuel injector is arranged to supply fuel into the primary combustion zone and the valve means controls the flow of fuel to the pilot fuel injector.

* * * * *